(12) United States Patent
Takano et al.

(10) Patent No.: US 12,084,536 B2
(45) Date of Patent: Sep. 10, 2024

(54) POLYBUTADIENE, METHOD OF PRODUCING POLYBUTADIENE, POLYBUTADIENE COMPOSITION, TIRE, AND RESIN MEMBER

(71) Applicant: BRIDGESTONE CORPORATION, Tokyo (JP)

(72) Inventors: Shigenaga Takano, Tokyo (JP); Shojiro Kaita, Tokyo (JP); Kohtaro Osakada, Tokyo (JP); Daisuke Takeuchi, Tokyo (JP); Shinji Yamakawa, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 696 days.

(21) Appl. No.: 17/287,626

(22) PCT Filed: Oct. 17, 2019

(86) PCT No.: PCT/JP2019/040873
§ 371 (c)(1),
(2) Date: Apr. 22, 2021

(87) PCT Pub. No.: WO2020/116037
PCT Pub. Date: Jun. 11, 2020

(65) Prior Publication Data
US 2021/0395407 A1    Dec. 23, 2021

(30) Foreign Application Priority Data
Dec. 5, 2018 (JP) ................................. 2018-228339

(51) Int. Cl.
| | |
|---|---|
| *C08F 36/06* | (2006.01) |
| *B60C 1/00* | (2006.01) |
| *C08F 4/70* | (2006.01) |
| *C08F 136/06* | (2006.01) |

(52) U.S. Cl.
CPC .............. *C08F 36/06* (2013.01); *B60C 1/00* (2013.01); *C08F 4/70* (2013.01); *C08F 136/06* (2013.01)

(58) Field of Classification Search
None
See application file for complete search history.

(56) References Cited

U.S. PATENT DOCUMENTS

| | | | | |
|---|---|---|---|---|
| 3,536,690 A | * | 10/1970 | Baldwin | ............. C08F 36/04 502/344 |
| 3,879,367 A | * | 4/1975 | Halasa | ............. C08F 136/06 526/139 |
| 5,548,045 A | * | 8/1996 | Goto | ............. C08F 136/06 526/161 |
| 5,879,805 A | * | 3/1999 | Brady | ............. C08F 136/06 428/407 |
| 11,472,907 B2 | * | 10/2022 | Takano | ............. C08F 236/06 |
| 2009/0115108 A1 | | 5/2009 | Rodgers et al. | |
| 2018/0105624 A1 | | 4/2018 | Xu et al. | |
| 2020/0347169 A1 | | 11/2020 | Takano et al. | |

FOREIGN PATENT DOCUMENTS

| | | |
|---|---|---|
| EP | 1896542 B1 | 6/2014 |
| JP | 10-168117 A | 6/1998 |
| JP | 2008-546890 A | 12/2008 |
| WO | 02/102861 A2 | 12/2002 |
| WO | 2018/220538 A1 | 12/2018 |
| WO | 2019/044855 A1 | 3/2019 |

OTHER PUBLICATIONS

Natta, "Stereospecific polymerization of conjugated dienes. W. Preparation and properties of isotactic 1,2-polybutadiene", Chimica e l'Industria, 1959, vol. 41, pp. 1165-1169 (Year: 1959).*
Translation of Natta, "Stereospecific polymerization of conjugated dienes. W. Preparation and properties of isotactic 1,2-polybutadiene", Chimica e l'Industria, 1959, vol. 41, pp. 1165-1169, obtained Dec. 2023 (Year: 2023).*
Giovanni Ricci et al., "New Chromium(II) Bidentate Phosphine Complexes: Synthesis, Characterization, and Behavior in the Polymerization of 1,3-Butadiene", Organometallics, 2004, pp. 3727-3732, vol. 23, No. 15.
International Search Report of PCT/JP2019/040873 dated Jan. 7, 2020 [PCT/ISA/210].
Kiyoshi Endo et al., "1,2-Polymerization of 1,3-Butadiene with Cr(acac)3-Alkylaluminum Catalysts", Journal of Applied Polymer Science, 2000, vol. 78, pp. 1621-1627 (7 pages total).
Eder Tomas-Mendivil et al., "Palladium(II) complexes with symmetrical dihydroxy-2,2'-bipyridine ligands: Exploring their inter- and intramolecular interactions in solid-state", 2013, vol. 59, 69-75 (7 pages total).
Database Compendex (Online) Engineering Information, Inc.,Ricci G et al., "Chromium complexes based catalysts: The role of the ligand nature in the polymerization of conjugated diolefins and cyclooefins", Chromium: Environmental, Medical and Materials Studies, 2011, Database Accession No. E20172403777826 (2 pages total).
Extended European Search Report dated Aug. 11, 2022 in European Application No. 19891970.6.
International Preliminary Report on Patentability dated Jun. 8, 2021 from the International Bureau in International Application No. PCT/JP2019/040873.
Endo et al, "1,2-Polymerization of 1,3-Butadiene with Cr(acac)3-Alkylaluminum Catalysts", Journal of Applied Polymer Science, vol. 78, Issue 9, pp. 1621-1627, 2000.

* cited by examiner

*Primary Examiner* — Nicole M. Buie-Hatcher
(74) *Attorney, Agent, or Firm* — Sughrue Mion, PLLC

(57) ABSTRACT

Provided is novel polybutadiene having high isotacticity. The polybutadiene has a triad isotacticity (mm) of 72% or more.

16 Claims, 2 Drawing Sheets

POLYBUTADIENE, METHOD OF PRODUCING POLYBUTADIENE, POLYBUTADIENE COMPOSITION, TIRE, AND RESIN MEMBER

CROSS REFERENCE TO RELATED APPLICATIONS

This application is a National Stage of International Application No. PCT/JP2019/040873 filed on Oct. 17, 2019, claiming priority based on Japanese Patent Application No. 2018-228339 filed on Dec. 5, 2018.

TECHNICAL FIELD

This disclosure relates to polybutadiene, a method of producing polybutadiene, a polybutadiene composition, a tire, and a resin member.

BACKGROUND

The stereoregularity of a polymer is one of the factors that determine the higher order structure such as crystal morphology and degree of crystallinity. Therefore, when the stereoregularity of a polymer changes, its physical properties also tend to change.

Production methods focusing on control of the stereoregularity of polybutadiene, which is a general-purpose synthetic rubber, have been reported. For example, JP H10-168117 A (PTL 1) describes that syndiotactic polybutadiene can be efficiently produced with a predetermined suspension polymerization method.

Note that the syndiotactic structure of polybutadiene refers to a three-dimensional structure in which vinyl groups (—CH═CH$_2$) of side chains are alternately located on the opposite sides of a main chain portion formed by 1,2-vinyl bond. On the other hand, a three-dimensional structure in which vinyl groups (—CH═CH$_2$) of side chains are located on the same side is called an isotactic structure, and a three-dimensional structure in which vinyl groups (—CH═CH$_2$) of side chains are randomly located is called an atactic structure.

CITATION LIST

Patent Literature

PTL 1: JP H10-168117 A

Non-Patent Literature

NPL 1: Giovanni Ricci et al., New Chromium (II) Bidentate Phosphine Complexes: Synthesis, Characterization, and Behavior in the Polymerization of 1,3-Butadiene, Organometallics 2004, 23, pp 3727-3732

SUMMARY

Technical Problem

On the other hand, not much research has been conducted on polybutadiene having an isotactic structure. The isotacticity of conventional polybutadiene was at most 71% in triad representation (mm) (NPL 1 above). Under such circumstances, it is desired to develop novel polybutadiene having higher isotacticity, in which peculiar physical properties can be expected.

It could thus be helpful to provide novel polybutadiene having high isotacticity. Additionally, it could be helpful to provide a method of producing polybutadiene with which polybutadiene having high isotacticity can be produced. Further, it could be helpful to provide a polybutadiene composition, a tire, and a resin member using the novel polybutadiene described above.

Solution to Problem

As a result of keen study, we have discovered that polybutadiene having high isotacticity, which has never existed before, can be prepared by using predetermined catalytic components, and completed the present disclosure.

The polybutadiene of the present disclosure has a triad isotacticity (mm) of 72% or more.

The method of producing polybutadiene of the present disclosure includes a process of polymerizing 1,3-butadiene using a catalyst containing a compound represented by the following structural formula I and a norbornene derivative to obtain polybutadiene:

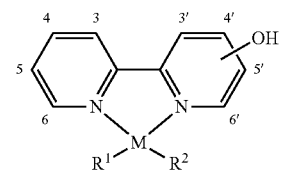

I (where in the formula, an OH group is bonded to at least one of 3 to 6 positions and 3' to 6' positions of a bipyridyl ring, M is a transition metal, $R^1$ and $R^2$ are hydrocarbon groups having one or more carbon atoms or halogen atoms, and $R^1$ and $R^2$ may be the same or different from each other).

The polybutadiene composition of the present disclosure comprises the polybutadiene described above.

The tire of the present disclosure uses the polybutadiene composition described above.

The resin member of the present disclosure uses the polybutadiene composition described above.

Advantageous Effect

According to the present disclosure, it is possible to provide novel polybutadiene having high isotacticity. Additionally, according to the present disclosure, it is possible to provide a method of producing polybutadiene with which polybutadiene having high isotacticity can be produced. Further, according to the present disclosure, it is possible to provide a polybutadiene composition, a tire, and a resin member using the novel polybutadiene described above.

DETAILED DESCRIPTION

Figure 1:
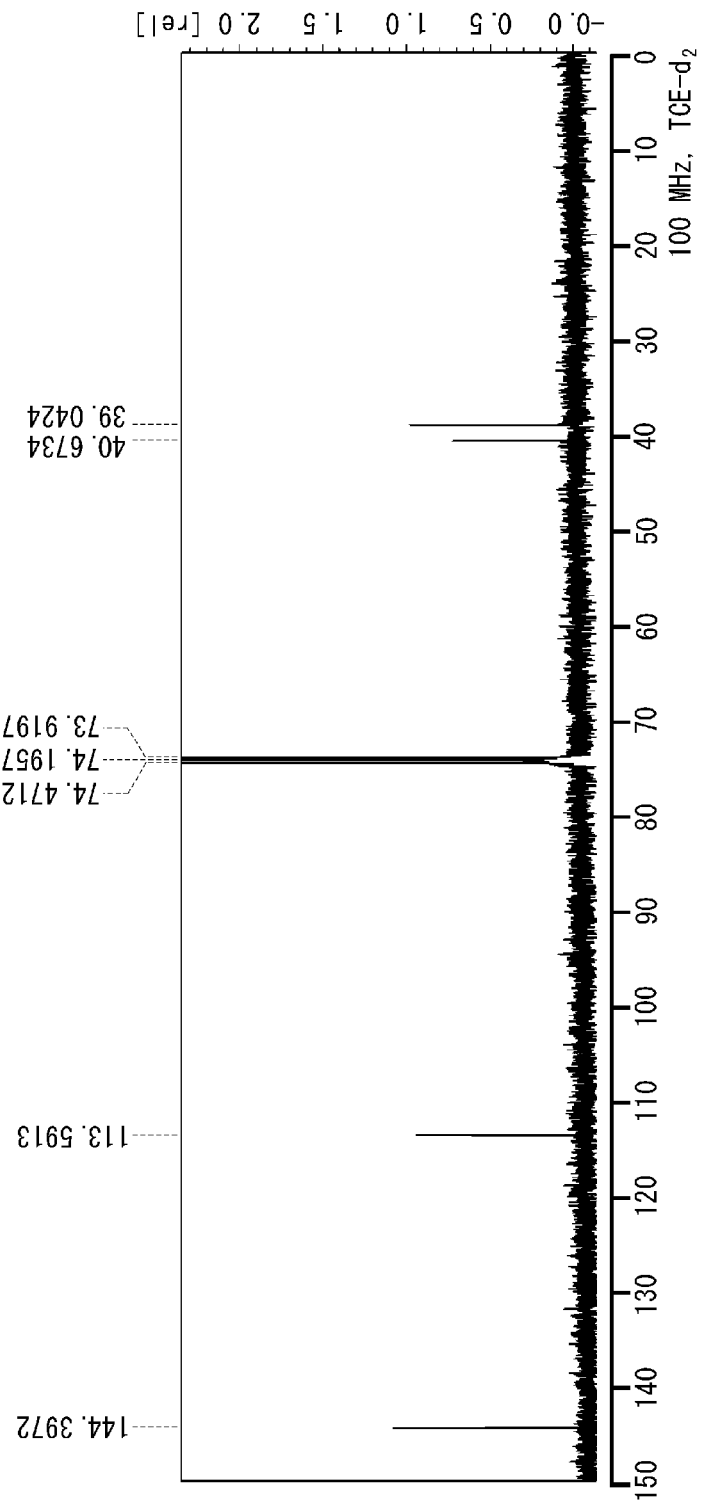
FIG. 1 is a schematic diagram of the $^{13}$C-NMR spectrum of polybutadiene of Example 1.

The following describes the present disclosure in detail based on embodiments.

(Polybutadiene)

The polybutadiene of one embodiment of the present disclosure (hereinafter, may be referred to as "polybutadiene of the present embodiment") has a triad isotacticity (mm) of 72% or more. Such polybutadiene having high isotacticity is expected to be capable of exhibiting physical properties different from those of conventional polybutadiene.

The triad isotacticity (mm) of the polybutadiene can be determined from the $^{13}$C-NMR spectrum. Specifically, the peak area values of [mm], [mr] and [rr] signals are determined from the $^{13}$C-NMR spectrum, respectively, and the triad isotacticity (mm) is determined as a ratio of [mm] among these. More specifically, the triad isotacticity (mm) of the polybutadiene is determined with the method described in the EXAMPLES section.

Note that the triad isotacticity (mm) of the polybutadiene is a term relating to 1,2-vinyl bond, and there is no concept of isotacticity regarding cis-1,4 bond or trans-1,4 bond.

The polybutadiene of the present embodiment can be produced, for example, with the method of producing polybutadiene of one embodiment of the present disclosure, which will be described later.

The triad isotacticity (mm) of the polybutadiene of the present embodiment is preferably 90% or more, more preferably 95% or more, still more preferably 99% or more, and particularly preferably 100%. In this case, the isotacticity of the polybutadiene is further increased, and therefore peculiar physical properties can be further expected in the polybutadiene.

The polybutadiene of the present embodiment preferably has a 1,2-vinyl bond content of 65% or more. In this case, the stereoregularity of the polybutadiene is further improved, and therefore peculiar physical properties can be further expected in the polybutadiene. From the same viewpoint, the 1,2-vinyl bond content of the polybutadiene of the present embodiment is more preferably 75% or more, more preferably 95% or more, and still more preferably 99% or more.

The 1,2-vinyl bond content of the polybutadiene can be adjusted, for example, by appropriately selecting the type, amount, etc. of each catalytic component to be used.

The 1,2-vinyl bond content can be determined from the $^{1}$H-NMR spectrum.

The polybutadiene of the present embodiment preferably has a melting point of 80° C. or higher and 130° C. or lower. In this case, the stereoregularity and the isotacticity of the polybutadiene tend to be high enough, and therefore peculiar physical properties can be further expected in the polybutadiene.

The melting point of the polybutadiene can be adjusted, for example, by appropriately controlling the molecular weight, the degree of polydispersity, and the like.

The melting point can be determined using a differential scanning calorimeter (DSC) in accordance with JIS K 7121-1987. When there is more than one melting point, a highest melting point is regarded as the melting point in the present specification.

(Method of Producing Polybutadiene)

The method of producing polybutadiene of one embodiment of the present disclosure (hereinafter, may be referred to as "production method of the present embodiment") includes a process (polymerization process) of polymerizing 1,3-butadiene using a catalyst containing at least a compound represented by the following structural formula I (hereinafter, may be referred to as "hydroxybipyridyl-based complex") and a norbornene derivative to obtain polybutadiene:

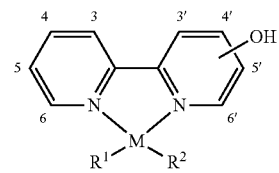

I (where in the formula, an OH group is bonded to at least one of 3 to 6 positions and 3' to 6' positions of a bipyridyl ring, M is a transition metal, $R^1$ and $R^2$ are hydrocarbon groups having one or more carbon atoms or halogen atoms, and $R^1$ and $R^2$ may be the same or different from each other). Further, in the production method of the present embodiment, catalytic components other than the above-mentioned hydroxybipyridyl-based complex and norbornene derivative may be used, as necessary.

According to the production method of the present embodiment, it is possible to produce polybutadiene having high isotacticity, particularly the polybutadiene described above.

<Hydroxybipyridyl-Based Complex>

The hydroxybipyridyl-based complex is a first catalytic component when polymerizing the 1,3-butadiene in the production method of the present embodiment. In the hydroxybipyridyl-based complex (compound represented by the structural formula I), the two N atoms on the bipyridyl ring are coordinated to the transition metal M. That is, the bipyridyl ring having at least one OH group is a ligand. Having at least one OH group on the bipyridyl ring enhances the polymerization activity. The hydroxybipyridyl-based complex may be used alone or in combination of two or more.

The hydroxybipyridyl-based complex acts as a catalyst for the polymerization reaction in the production method of the present embodiment. In the hydroxybipyridyl-based complex, the OH group is bonded to at least one of the 3 to 6 positions and 3' to 6' positions of the bipyridyl ring. The number of OH groups is preferably two from the viewpoint of polymerization activity.

When the hydroxybipyridyl-based complex has two OH groups, the positions of the OH groups are not particularly limited. However, they may be symmetrical as in the following formula I-1 (3 and 3' positions), formula I-2 (4 and 4' positions), formula I-3 (5 and 5' positions) and formula I-4 (6 and 6' positions), or they may be asymmetrical as in the following formula I-5 (5 and 6' positions) and formula I-6 (4 and 6' positions), for example.

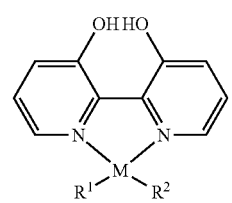

I-1

-continued

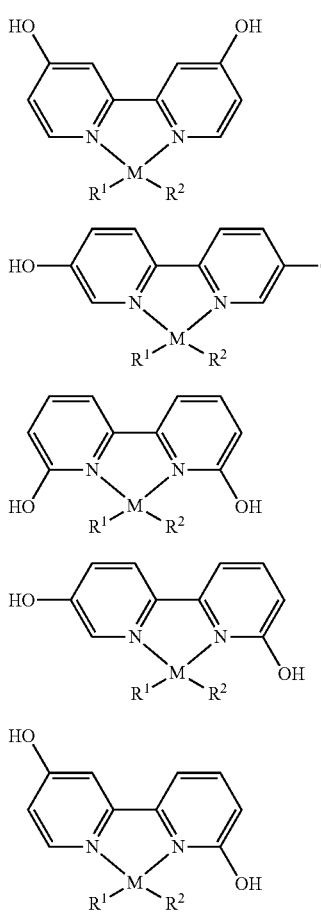

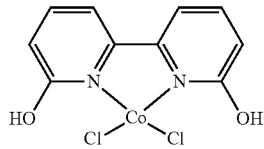
(DHBP)CoCl$_2$

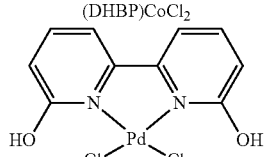
(DHBP)PdCl$_2$

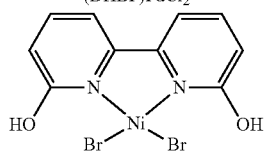
(DHBP)NiBr$_2$

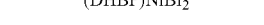

The M in the structural formula I is a transition metal. Examples of the transition metal include scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), and lanthanoids (lanthanum (La) of atomic number 57 to lutetium (Lu) of atomic number 71).

From the viewpoint of further enhancing the polymerization activity, the M in the structural formula I is preferably iron (Fe), cobalt (Co), nickel (Ni), palladium (Pd) or copper (Cu), and more preferably nickel (Ni).

The $R^1$ and $R^2$ in the structural formula I are hydrocarbon groups having one or more carbon atoms or halogen atoms. The $R^1$ and $R^2$ may be the same or different from each other.

Examples of the hydrocarbon group having one or more carbon atoms include a hydrocarbon group having one to four carbon atoms, and examples thereof include a methyl group and an isopropyl group.

Examples of the halogen atom include fluorine, chlorine, bromine, and iodine.

In particular, the $R^1$ and $R^2$ in the structural formula I are preferably halogen atoms, more preferably chlorine or bromine, and still more preferably bromine, from the viewpoint of further enhancing the polymerization activity.

Specific examples of the hydroxybipyridyl-based complex include the following dihydroxybipyridyl (hereinafter, may be simply referred to as "DHBP") CoCl$_2$, (DHBP) PdCl$_2$, and (DHBP)NiBr$_2$.

The amount of the hydroxybipyridyl-based complex used may be adjusted by appropriately adjusting a mol ratio of the 1,3-butadiene as a monomer and the transition metal M in the hydroxybipyridyl-based complex (monomer/M). From the viewpoint of increasing the activity, the molecular weight of the polymer, and the degree of polydispersity (Mw/Mn), it is preferably 200 or more, more preferably 300 or more, and still more preferably 350 or more.

The method of synthesizing the hydroxybipyridyl-based complex is not particularly limited. For example, in the case of (DHBP)NiBr$_2$, DHBP (that is, 6,6'-dihydroxy-2,2'-bipyridine) may be reacted with NiBr$_2$ in a solvent such as THF, and, for example, appropriately filtered, washed, and dried to obtain (DHBP)NiBr$_2$.

<Norbornene Derivative>

The production method of the present embodiment uses a norbornene derivative. The norbornene derivative is a second catalytic component when polymerizing the 1,3-butadiene in the production method of the present embodiment. By using a norbornene derivative, polybutadiene having high isotacticity can be obtained.

In the present specification, the norbornene derivative refers to a compound having at least a norbornene skeleton, which does not include norbornene itself.

In a case where norbornene is used instead of the norbornene derivative, polybutadiene (homopolymer) may not be obtained because of the norbornene acting as a monomer in the polymerization.

The norbornene derivative preferably has an amino group. When the norbornene derivative has an amino group, the 1,2-vinyl bond content of the obtained polybutadiene is increased, and the stereoregularity can be further enhanced.

Note that the amino group is a group represented by —NR$^a$R$^b$ (R$^a$ and R$^b$ are hydrogen atoms or arbitrary groups, which may be the same or different from each other).

Preferable examples of the norbornene derivative described above include 5-norbornene-2-methylamine, 5-norbornene-2-ethylamine, 5-norbornene-2-propylamine, and 5-norbornene-2-butylamine, among which 5-norbornene-2-methylamine is more preferable.

The amount of the norbornene derivative used is preferably in a ratio of 3 mol % to 40 mol % with respect to the 1,3-butadiene as a monomer. In this case, the effect of increasing the isotacticity of the obtained polybutadiene can be more sufficiently obtained.

<Other Catalytic Components>

In the production method of the present embodiment, the catalyst preferably further contains a compound represented by the following structural formula II:

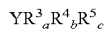

$$YR^3_a R^4_b R^5_c \quad \text{Formula II}$$

(where in the formula, Y is a metal selected from Group 1, Group 2, Group 12 and Group 13 of the periodic table, $R^3$ and $R^4$ are hydrogen atoms, or substituted or unsubstituted hydrocarbon groups having 1 to 20 carbon atoms, alkoxy groups or aryloxy groups, $R^5$ is a substituted or unsubstituted hydrocarbon group having 1 to 20 carbon atoms, an alkoxy group or an aryloxy group, $R^3$, $R^4$ and $R^5$ may be the same or different from each other, a, b and c are independently 0 or 1; note that when Y is a metal selected from the Group 1, a is 1, and b and c are 0; when Y is a metal selected from the Group 2 and the Group 12, a and b are 1, and c is 0; when Y is a metal selected from the Group 13, a, b and c are 1). By using the compound represented by the structural formula II as a catalytic component, the polymerization activity can be further enhanced. The compound represented by the structural formula II may be used alone or in combination of two or more.

Examples of the Y in the structural formula II include lithium (Li), sodium (Na), potassium (K), rubidium (Rb), cesium (Cs), francium (Fr), beryllium (Be), magnesium (Mg), calcium (Ca), strontium (Sr), barium (Ba), radium (Ra), zinc (Zn), cadmium (Cd), mercury (Hg), boron (B), aluminum (Al), gallium (Ga), indium (In), and thallium (Ti).

From the viewpoint of further enhancing the polymerization activity, the Y in the structural formula II is preferably lithium (Li), boron (B) or aluminum (Al), and more preferably aluminum (Al).

Examples of the hydrocarbon group of $R^3$, $R^4$ and $R^5$ in the structural formula II include a methyl group, an ethyl group, an n-propyl group, an isopropyl group, an n-butyl group, a sec-butyl group, an isobutyl group, a tert-butyl group, and a phenyl group. Further, the hydrocarbon group, alkoxy group and aryloxy group of $R^3$, $R^4$ and $R^5$ in the compound of the structural formula II may be substituted with a substituent, and examples of the substituent include a linear or branched alkyl group (for example, a methyl group or a tert-butyl group) and a halogen (for example, fluorine).

Specific examples of the compound represented by the structural formula II include tris (pentafluorophenyl) borane, trimethylaluminum, triethylaluminum, triisobutylaluminum (TIBA), lithium 2,6-di-tert-butyl-4-methylphenoxide, bis (2,6-di-tert-butyl-4-methylphenoxy) methylaluminum, and diisobutylaluminum hydride. Among these, tris (pentafluorophenyl) borane, trimethylaluminum, triisobutylaluminum (TIBA), lithium 2,6-di-tert-butyl-4-methylphenoxide, bis (2,6-di-tert-butyl-4-methylphenoxy) methylaluminum and the like can be mentioned.

In a case where the compound represented by the structural formula II is used, the amount used is preferably 2 equivalents to 200 equivalents, more preferably 10 equivalents to 200 equivalents, and still more preferably 20 equivalents to 200 equivalents with respect to the transition metal M in the hydroxybipyridyl-based complex, from the viewpoint of polymerization activity.

In the production method of the present embodiment, the catalyst preferably further contains aluminoxane. Using aluminoxane as a catalytic component can provide polymerization active species efficiently. Aluminoxane may be used alone or in combination of two or more.

Aluminoxane is a compound obtained by contacting an organic aluminum compound with a condensation agent such as water. Examples of the aluminoxane include chain aluminoxane and cyclic aluminoxane having a repeating unit represented by the general formula (—Al(R')O—). In the general formula, the R' is a hydrocarbon group having 1 to 10 carbon atoms, and a part of the hydrocarbon group may be substituted with a halogen atom and/or an alkoxy group.

The number of the repeating units (degree of polymerization) of the aluminoxane is preferably 5 or more, and more preferably 10 or more. Further, examples of the R' in the general formula include a methyl group, an ethyl group, a propyl group, and an isobutyl group. In one embodiment, the R' is a methyl group.

Examples of the organic aluminum compound, which is a raw material of the aluminoxane, include trialkylaluminum such as trimethylaluminum, triethylaluminum and triisobutylaluminum, and a mixture thereof. In one embodiment, the organic aluminum compound is trimethylaluminum.

The aluminoxane may be a commercially available product. Examples of such a commercially available product include MMAO and TMAO manufactured by Tosoh Finechem Corporation.

In the case of using aluminoxane, the amount used is preferably such that Al in the aluminoxane is in a ratio of 2 equivalents or more with respect to the transition metal M of the hydroxybipyridyl-based complex, from the viewpoint of polymerization activity.

In the production method of the present embodiment, the catalyst preferably further contains at least one of an ionic compound and a halogen compound. By using at least one of an ionic compound and a halogen compound as the catalytic component, the proportion of impurities in the obtained polybutadiene can be reduced.

Examples of the ionic compound include N,N-dimethylanilinium tetrakis(pentafluorophenyl)borate and triphenylcarbonium tetrakis(pentafluorophenyl)borate described in JP 2014-109729 A. The ionic compound may be used alone or in combination of two or more.

Examples of the halogen compound include organometallic halogen compounds such as ethyl aluminum dichloride, ethyl magnesium chloride, butyl magnesium chloride, dimethyl aluminum chloride, diethyl aluminum chloride, and sesquiethyl aluminum chloride. The halogen compound may be used alone or in combination of two or more.

<Production of Polybutadiene>

In the production method of the present embodiment, the 1,3-butadiene, which is a monomer, is polymerized in a polymerization system including the hydroxybipyridyl-based complex, the norbornene derivative, and any of the above-mentioned other catalytic components to obtain polybutadiene (polymerization process). Further, the production method of the present embodiment may appropriately include other processes such as a process of purifying the polybutadiene obtained in the polymerization process (purification process) and a process of cleaning the polybutadiene obtained in the polymerization process (cleaning process), if necessary.

The polymerization method is not particularly limited, and for example, coordination polymerization, solution polymerization (anionic polymerization) and the like can be used. Further, the polymerization may be performed with any conventionally known method such as continuous polymerization, semi-continuous polymerization, and batch polymerization.

In the polymerization process, a polymerization solvent, a polymerization initiator, a terminator, a stabilizer, an extender oil, a modifying agent, etc. may be used in addition to the monomer and the above-mentioned catalytic components, without departing from the spirit of the present disclosure. Examples of the polymerization solvent include, but are not limited to, hydrocarbon solvents such as benzene, toluene, cyclohexane, hexane, and butene.

The polymerization temperature is not particularly limited and may be appropriately set according to the type of the catalytic components, desired 1,2-vinyl bond content, number-average molecular weight, degree of polydispersity, Mooney viscosity, and the like. In one embodiment, the polymerization temperature may be, for example, −100° C. to 150° C.

The polymerization process may be performed in an atmosphere of an inert gas such as nitrogen ($N_2$) gas or argon (Ar) gas.

In the polymerization process, it is preferable to add the 1,3-butadiene and the norbornene derivative into the polymerization system in the stated order. By adding the materials into the polymerization system in this order, the stereoregularity of the obtained polybutadiene and thus the isotacticity of the obtained polybutadiene can be further enhanced. From the same viewpoint, in the polymerization process, it is more preferable to add the hydroxybipyridyl-based complex, the 1,3-butadiene, and the norbornene derivative to the polymerization system in the stated order. Note that "add the 1,3-butadiene and the norbornene derivative in the stated order" refers to any case where the 1,3-butadiene is added before the norbornene derivative is added, which includes a case, for example, where any catalytic component or the like is added between the addition of the 1,3-butadiene and the addition of the norbornene derivative.

When aluminoxane is used as a catalyst component, it is preferable to add the aluminoxane after the norbornene derivative.

(Polybutadiene Composition)

The polybutadiene composition of one embodiment of the present disclosure (hereinafter, may be referred to as "polybutadiene composition of the present embodiment") contains the polybutadiene described above. Because the polybutadiene composition of the present embodiment contains the above-described novel polybutadiene having high isotacticity, it can be appropriately used for various purposes.

The polybutadiene composition of the present embodiment may contain other rubber components in addition to the above-described polybutadiene. Examples of the other rubber components include natural rubber, synthetic isoprene rubber, butadiene rubber (other than the polybutadiene of the present embodiment), styrene-butadiene rubber, butyl rubber, and bromide of a copolymer of isobutylene and p-methylstyrene, halogenated butyl rubber, acrylonitrile-butadiene rubber, chloroprene rubber, ethylene-propylene rubber, ethylene-propylene-diene rubber, styrene-isoprene rubber, styrene-isoprene-butadiene rubber, isoprene-butadiene rubber, chlorosulfonated polyethylene, acrylic rubber, epichlorohydrin rubber, polysulfide rubber, silicone rubber, fluororubber, and urethane rubber. These other rubber components may be used alone or in combination of two or more. In particular, the polybutadiene composition of the present embodiment preferably contains other rubber components when used in the production of tires, which will be described later.

The polybutadiene composition of the present embodiment may contain a resin component. The resin component is not particularly limited and may be appropriately selected depending on the intended purpose. The resin may be used alone or in combination of two or more. In particular, the polybutadiene composition of the present embodiment preferably contains a resin component when used in the production of resin members, which will be described later.

The polybutadiene composition of the present embodiment may appropriately contain known additives that are blended in rubber compositions, resin compositions and the like. Examples of such additives include filler, a vulcanizing agent, a crosslinking agent, a vulcanization accelerator, an age resistor, a reinforcing agent, a softener, a vulcanizing co-agent, a colorant, a flame retardant, a lubricant, a foaming agent, a plasticizer, a processing aid, an antioxidant, an anti-scorch agent, an ultraviolet rays protecting agent, an antistatic agent, a color protecting agent, and oil. Each of these additives may be used alone or in combination of two or more.

The method of preparing the polybutadiene composition of the present embodiment is not particularly limited, and a known method can be used. For example, the polybutadiene composition can be obtained by kneading each component including the above-described polybutadiene using a kneader such as a Banbury mixer, a roll, or an internal mixer. Further, the polybutadiene composition can be prepared by mixing components other than a vulcanizing agent and a vulcanization accelerator, and blending and mixing a vulcanizing agent and a vulcanization accelerator with the mixture.

The polybutadiene composition of the present embodiment can be used, for example, to produce rubber articles such as tires, conveyor belts, anti-vibration rubber, seismic isolation rubber, rubber crawlers and rubber hoses, resin members that will be described later, and the like.

The method of obtaining a rubber article or a resin member using the polybutadiene composition of the present embodiment is not particularly limited, and a known method can be used. For example, the conditions for cross-linking or vulcanizing the polybutadiene composition may be appropriately adjusted, and the conditions may be, for example, a temperature of 120° C. to 200° C. and a heating time of 1 minute to 900 minutes.

(Tire)

The tire of one embodiment of the present disclosure uses the polybutadiene composition described above. The application of the above-described rubber composition in a tire is not particularly limited, and it may be applied to, for example, tread rubber, base tread rubber, sidewall rubber, side-reinforcing rubber and bead filler, and inner liner.

(Resin Member)

The resin member of one embodiment of the present disclosure uses the polybutadiene composition described above. Examples of the resin member include automobile members such as a bumper, a dashboard, a door trim and an instrument panel, members for building interior, general furniture, office furniture, sports equipment, shoes, films, tubes, hoses, and photosensitive materials.

EXAMPLES

The following describes the present disclosure in more detail with reference to Examples. However, the present disclosure is not limited to the following Examples and may be appropriately modified without departing from the spirit thereof.

The materials used in Examples are as follows:
6,6'-dihydroxy-2,2'-bipyridine (DHBP) manufactured by Tokyo Chemical Industry Co., Ltd.;
nickel bromide (NiBr$_2$) manufactured by Tokyo Chemical Industry Co., Ltd.; and
triisobutylaluminum (TIBA, a compound represented by the structural formula II) manufactured by Wako Pure Chemical Industries, Ltd.

The DHBP and (DHBP)NiBr$_2$ in Examples refer to the following structures, respectively.

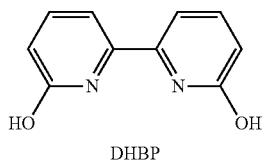

DHBP

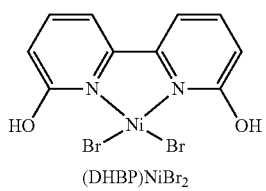

(DHBP)NiBr$_2$ (Synthesis of (DHBP)NiBr$_2$ (Hydroxybipyridyl-Based Complex))

DHBP and NiBr$_2$ were reacted in THF at room temperature for 24 hours to obtain the desired product (DHBP)NiBr$_2$. Structural analysis was performed by IR measurement and element analysis to confirm that the obtained compound was (DHBP)NiBr$_2$.

Example 1

First, 0.02 mmol of (DHBP)NiBr$_2$ was added in a glass bottle, the glass bottle was sealed with a rubber stopper, and Ar was flowed for 10 minutes to replace the inside of the system with an Ar atmosphere. After adding 10 mL of toluene into the glass bottle and cooling it to −20° C., 570 mg of 1,3-butadiene, 62 mg of 5-norbornene-2-methylamine, and methyl aluminoxane (MAO) (in an amount such that Al in MAO is 100 equivalents with respect to Ni) were added in the stated order, and the mixture was reacted at 30° C. for 1 hour. After the reaction, the reaction mixture was added dropwise to a 5% hydrochloric acid-methanol solution, a white solid was recovered by suction filtration, and the white solid was washed with chloroform to obtain polybutadiene (yield: 154 mg).

Example 2

First, 0.02 mmol of (DHBP)NiBr$_2$ was added in a glass bottle, the glass bottle was sealed with a rubber stopper, and Ar was flowed for 10 minutes to replace the inside of the system with an Ar atmosphere. After adding 10 mL of toluene into the glass bottle and cooling it to −20° C., 550 mg of 1,3-butadiene, 62 mg of 5-norbornene-2-methylamine, and methyl aluminoxane (MAO) (in an amount such that Al in MAO is 100 equivalents with respect to Ni) were added in the stated order, and the mixture was reacted at 30° C. for 1 hour. After the reaction, the reaction mixture was added dropwise to a 5% hydrochloric acid-methanol solution, a white solid was recovered by suction filtration, and the white solid was washed with chloroform to obtain polybutadiene (yield: 119 mg).

Comparative Example 1

First, 0.02 mmol of (DHBP)NiBr$_2$ was added in a glass bottle, the glass bottle was sealed with a rubber stopper, and Ar was flowed for 10 minutes to replace the inside of the system with an Ar atmosphere. After adding 30 mL of toluene into the glass bottle and cooling it to −20° C., 5520 mg of 1,3-butadiene, and methyl aluminoxane (MAO) (in an amount such that Al in MAO is 100 equivalents with respect to Ni) were added in the stated order, and the mixture was reacted at 30° C. for 1 hour. After the reaction, the reaction mixture was added dropwise to a 5% hydrochloric acid-methanol solution and decanted to obtain polybutadiene (yield: 4110 mg) which was a colorless and transparent rubber-like solid.

The polybutadiene obtained in each example was subjected to the following measurements.

<Microstructure>

The cis-1,4 bond content, trans-1,4 bond content, and 1,2-vinyl bond content of the polybutadiene were determined based on, for example, an integration ratio of the $^1$H-NMR spectrum (1,2-vinyl bond content) and the $^{13}$C-NMR spectrum (a content ratio of cis-1,4 bond and trans-1,4 bond).

Further, the triad isotacticity (mm) of the polybutadiene was determined based on the $^{13}$C-NMR spectrum (1,1,2,2-heavy tetrachloroethane solvent, 100° C., 100 MHz). The signal of carbon having a double bond and a bond with two hydrogens (the underlined carbon in " . . . —CH═CH$_2$") in the 1,2-vinyl bond (vinylidene unit) of the polybutadiene is observed in the vicinity of 105 ppm to 125 ppm. Note that the [mm] signal, the [mr] signal and the [rr] signal are observed separately, and particularly, the [mm] signal is observed at 113.65 ppm. Based on this, the triad isotacticity (mm) (%) was calculated with the following expression. The results are listed in Table 1.

(mm)(%)=(integration intensity ratio of 113.65 ppm±0.1 ppm/total of integration intensity ratios of 105 ppm to 125 ppm)×100

For reference, the $^{13}$C-NMR spectrum of the polybutadiene of Example 1 is illustrated in FIG. 1.

<Melting Point>

Figure 2:
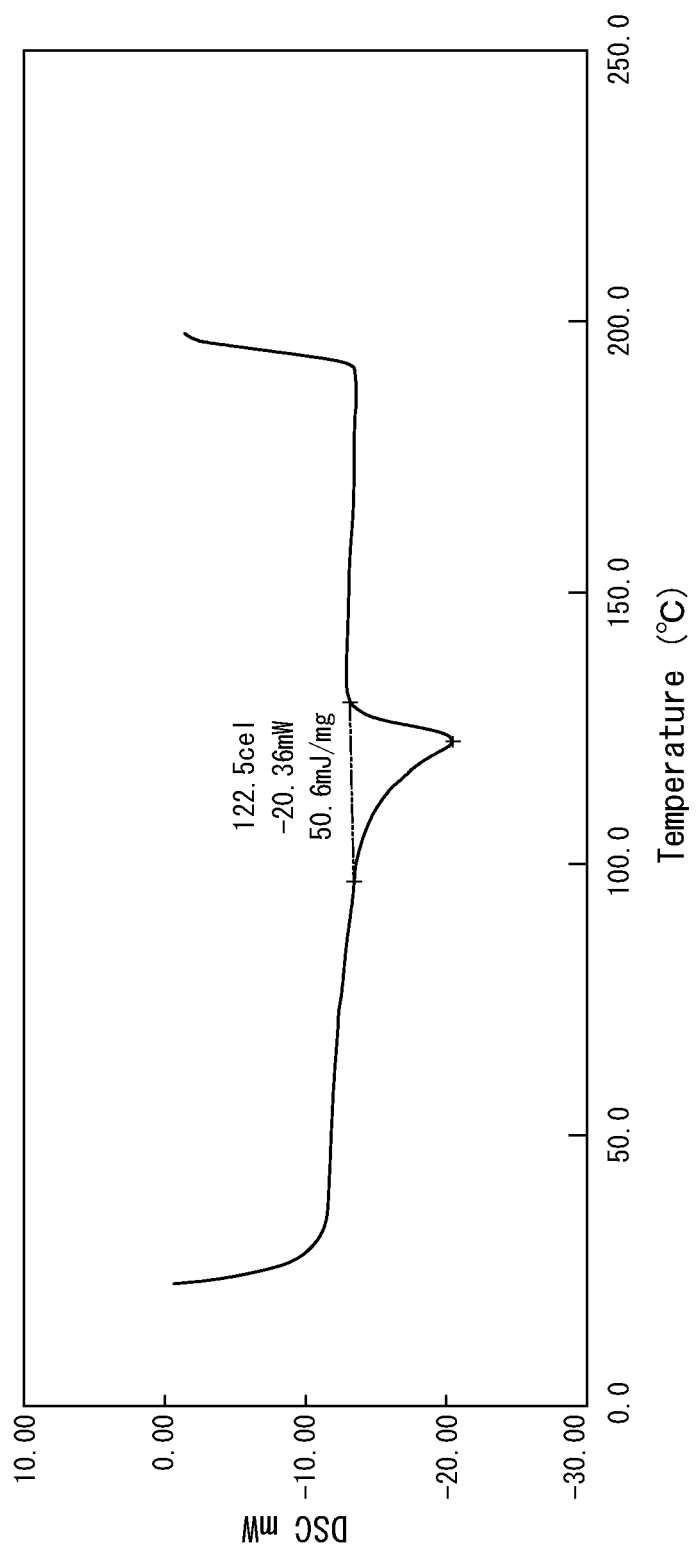
FIG. 2 is a schematic diagram of a DSC curve of polybutadiene of Example 1.

The melting point of the polybutadiene was measured using a differential scanning calorimeter (DSC, manufactured by TA Instruments Japan Inc., "DSCQ2000") in accordance with JIS K7121-1987. When only the melting point of the polybutadiene of Example 1 was measured, it was 122.5° C. as illustrated in FIG. 2.

<Number-Average Molecular Weight (Mn) and Molecular Weight Distribution (Mw/Mn)>

The polystyrene-equivalent number-average molecular weight (Mn) of the polybutadiene was determined by gel permeation chromatography [GPC: HLC-8321GPC/HT manufactured by Tosoh, column: two HT-806Ms manufactured by Showa Denko K.K., detector: differential refractometer (RI)] using monodisperse polystyrene as a reference. Further, the weight-average molecular weight (Mw) was determined in the same manner, and the molecular weight distribution (Mw/Mn) was calculated. The results are listed in Table 1. The measurement temperature was 140° C.

TABLE 1

| | First catalytic component | Second catalytic component | BD [mg] | NBA [mg] | Amount of NBA used with respect to BD [mol %] | Microstructure Cis-1,4 bond content [%] | Trans-1,4 bond content [%] | 1,2-Vinyl bond content [%] | mm [%] | $M_n$ | $M_w/M_n$ |
|---|---|---|---|---|---|---|---|---|---|---|---|
| Example 1 | (DHBP)NiBr$_2$ | NBA | 570 | 62 | 5.3 | <1 | <1 | >99 | >99 | 542,000 | 2.24 |
| Example 2 | (DHBP)NiBr$_2$ | NBA | 550 | 62 | 5.3 | <1 | <1 | >99 | >99 | 376,000 | 2.2 |
| Comparative Example 1 | (DHBP)NiBr$_2$ | — | 5520 | — | 0 | 92 | 3.9 | 4.2 | 0 | 26,200 | 2.48 |

The meaning of each abbreviation in Table 1 is as follows:
BD: 1,3-butadiene; and
NBA: 5-norbornene-2-methylamine.

From Table 1, it is understood that in Examples 1 and 2, polybutadiene having high isotacticity was obtained. Further, it is understood that such polybutadiene having high isotacticity can be produced by using at least a hydroxybipyridyl-based complex and a norbornene derivative as catalytic components.

On the other hand, Comparative Example 1 did not use norbornene derivative as a catalytic component, so that the cis-1,4 bond content increased, and the triad isotacticity was 0%.

INDUSTRIAL APPLICABILITY

According to the present disclosure, it is possible to provide novel polybutadiene having high isotacticity. Additionally, according to the present disclosure, it is possible to provide a method of producing polybutadiene with which polybutadiene having high isotacticity can be produced. Further, according to the present disclosure, it is possible to provide a polybutadiene composition, a tire, and a resin member using the novel polybutadiene described above.

The invention claimed is:

1. Polybutadiene having a triad isotacticity (mm), which is determined from $^{13}$C-NMR spectrum, of 90% or more, wherein the polybutadiene has a 1,2-vinyl bond content of 65% or more.

2. The polybutadiene according to claim 1, which has a melting point of 80° ° C. or higher and 130° C. or lower.

3. A polybutadiene composition comprising the polybutadiene according to claim 2.

4. A tire using the polybutadiene composition according to claim 3.

5. A resin member using the polybutadiene composition according to claim 3.

6. A polybutadiene composition comprising the polybutadiene according to claim 1.

7. A tire using the polybutadiene composition according to claim 6.

8. A resin member using the polybutadiene composition according to claim 6.

9. A method of producing polybutadiene, comprising a process of polymerizing 1,3-butadiene using a catalyst containing a compound represented by the following structural formula I and a norbornene derivative to obtain polybutadiene:

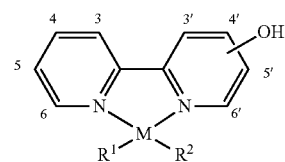

Formula I wherein an OH group is bonded to at least one of 3 to 6 positions and 3' to 6' positions of a bipyridyl ring, M is a transition metal, $R^1$ and $R^2$ are hydrocarbon groups having one or more carbon atoms or halogen atoms, and $R^1$ and $R^2$ may be the same or different from each other.

10. The method of producing polybutadiene according to claim 9, wherein the catalyst further contains a compound represented by the following structural formula II:

$$YR^3_a R^4_b R^5_c \qquad \text{Formula II}$$

wherein Y is a metal selected from Group 1, Group 2, Group 12 and Group 13 of the periodic table, $R^3$ and $R^4$ are hydrogen atoms, or substituted or unsubstituted hydrocarbon groups having 1 to 20 carbon atoms, alkoxy groups or aryloxy groups, $R^5$ is a substituted or unsubstituted hydrocarbon group having 1 to 20 carbon atoms, an alkoxy group or an aryloxy group, $R^3$, $R^4$ and $R^5$ may be the same or different from each other, a, b and c are independently 0 or 1; note that when Y is a metal selected from the Group 1, a is 1, and b and c are 0; when Y is a metal selected from the Group 2 and the Group 12, a and b are 1, and c is 0; when Y is a metal selected from the Group 13, a, b and c are 1.

11. The method of producing polybutadiene according to claim 9, wherein the catalyst further contains aluminoxane.

12. The method of producing polybutadiene according to claim 9, wherein the catalyst further contains at least one of an ionic compound and a halogen compound.

13. The method of producing polybutadiene according to claim 9, wherein the M in the structural formula I is iron (Fe), cobalt (Co), nickel (Ni), palladium (Pd) or copper (Cu).

14. The method of producing polybutadiene according to claim 9, wherein the norbornene derivative has an amino group.

15. The method of producing polybutadiene according to claim 9, wherein the norbornene derivative is used in a ratio of 3 mol % to 40 mol % with respect to the 1,3-butadiene.

16. The method of producing polybutadiene according to claim 9, wherein the 1,3-butadiene and the norbornene derivative are added to a polymerization system in the stated order.

* * * * *